Feb. 25, 1964 W. E. GARDIPEE 3,122,251
UNLOADING CONVEYOR FOR DUMP TRUCKS
Filed June 15, 1962 3 Sheets-Sheet 1

INVENTOR.
WALTER E. GARDIPEE,
BY
McMorrow, Berman & Davidson
ATTORNEYS.

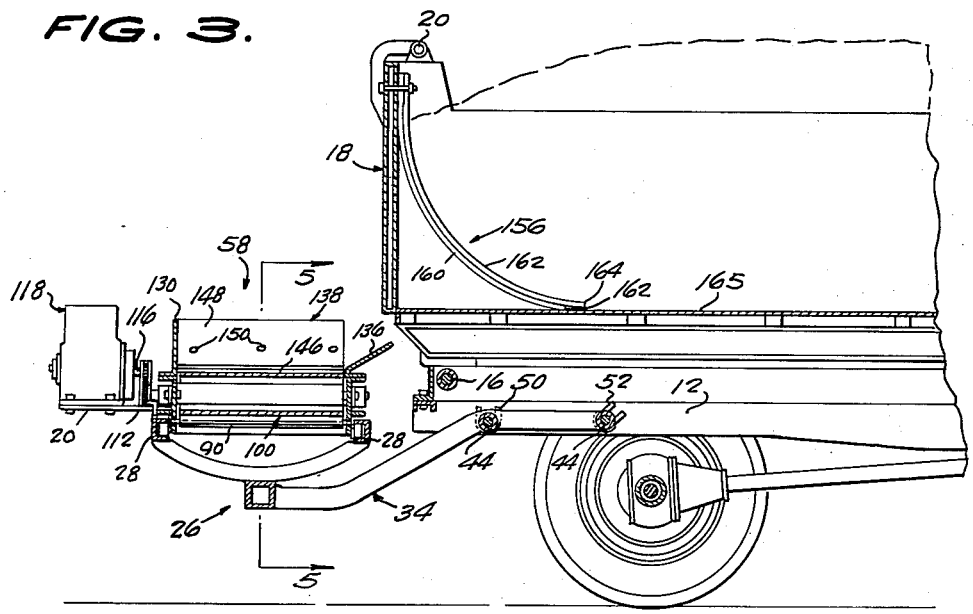
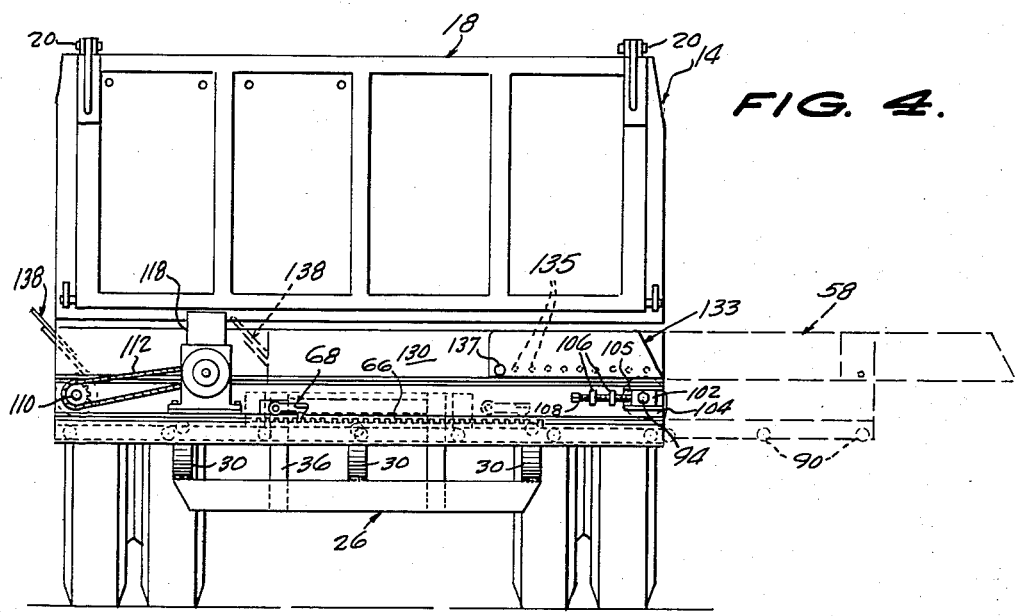

Feb. 25, 1964 W. E. GARDIPEE 3,122,251
UNLOADING CONVEYOR FOR DUMP TRUCKS
Filed June 15, 1962 3 Sheets-Sheet 3
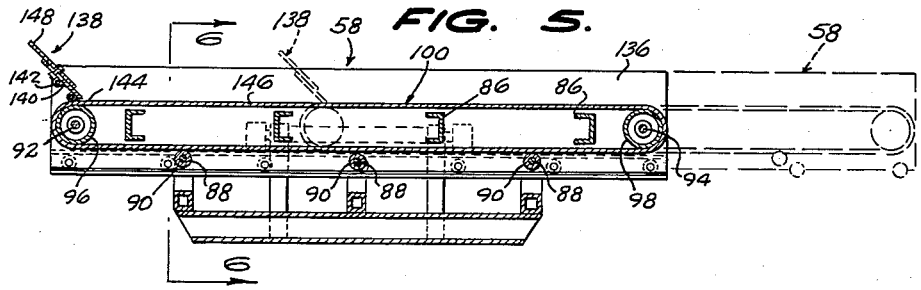
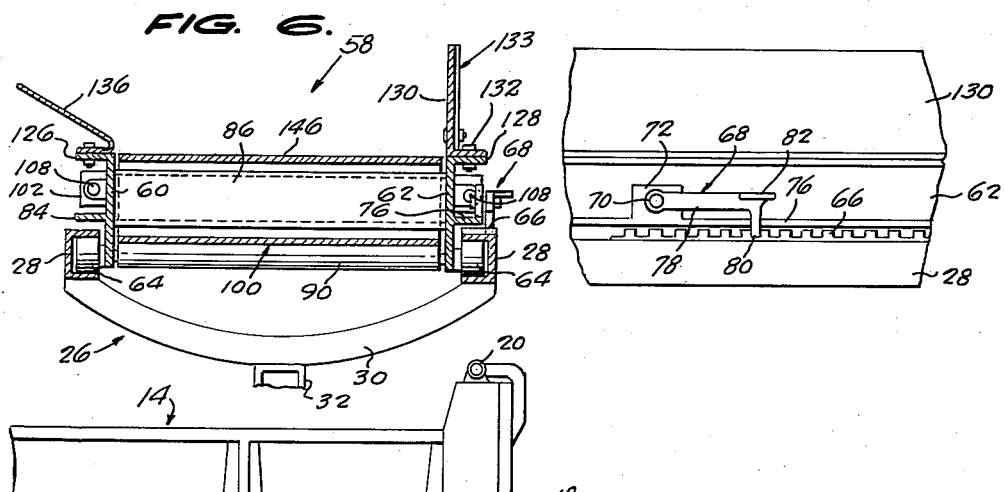
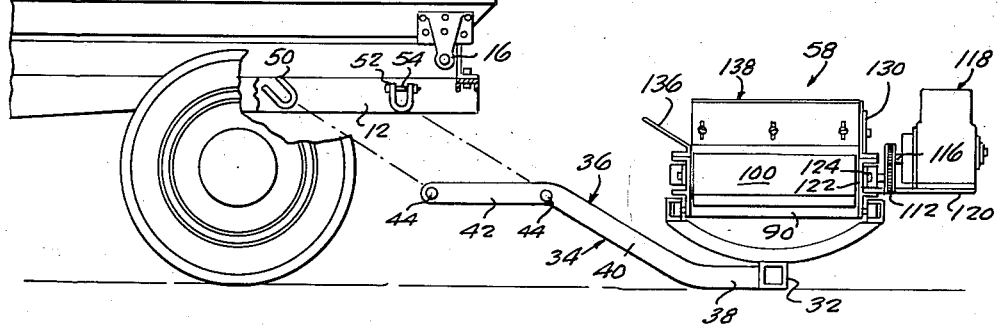
INVENTOR.
WALTER E GARDIPEE,
BY
McMorrow, Berman & Davidson
ATTORNEYS.

United States Patent Office 3,122,251
Patented Feb. 25, 1964

3,122,251
UNLOADING CONVEYOR FOR DUMP TRUCKS
Walter E. Gardipee, Concord, Tenn.
(363 Conners Lane, Hebron, Ky.)
Filed June 15, 1962, Ser. No. 202,910
3 Claims. (Cl. 214—509)

This invention relates to a novel self-powered conveyor attachment for dump trucks.

The primary object of the invention is the provision of a generally improved, more efficient and practical attachment of the kind indicated, which is easily installed and removed from the frame of a dump truck, is driven by a self-carried motor, and is especially but not exclusively adapted for temporary installation on trucks having tail-gate equipped dump bodies.

Another object of the invention is the provision of a simple and inexpensive attachment of the character indicated above, which utilizes an endless belt which is mounted on a frame which is slidably supported, to be moved from a retracted non-use position to different extended use positions, at one side of the truck, for conveying and depositing material discharged from the truck onto the belt, to locations spaced from the side of the truck.

Other important objects and advantageous features of the invention will be apparent from the following description and the accompanying drawings, wherein, for purposes of illustration only, a specific form of the invention is set forth in detail.

In the drawings:

FIGURE 3 is a vertical longitudinal section taken on the line 3—3 of FIGURE 1;

FIGURE 4 is a rear elevation of FIGURE 2, showing the conveyor in retracted non-use position, in full lines, and in extended use position in phantom lines;

FIGURE 5 is a vertical longitudinal section taken on the line 5—5 of FIGURE 3;

FIGURE 6 in an enlarged vertical section taken on the line 6—6 of FIGURE 5;

FIGURE 7 is a fragmentary rear elevation of the attachment, showing details of the latch arrangement;

FIGURE 8 is a side elevation, partly broken away, showing the attachment removed from the truck and indicating its installation on the truck frame.

Figure 1:
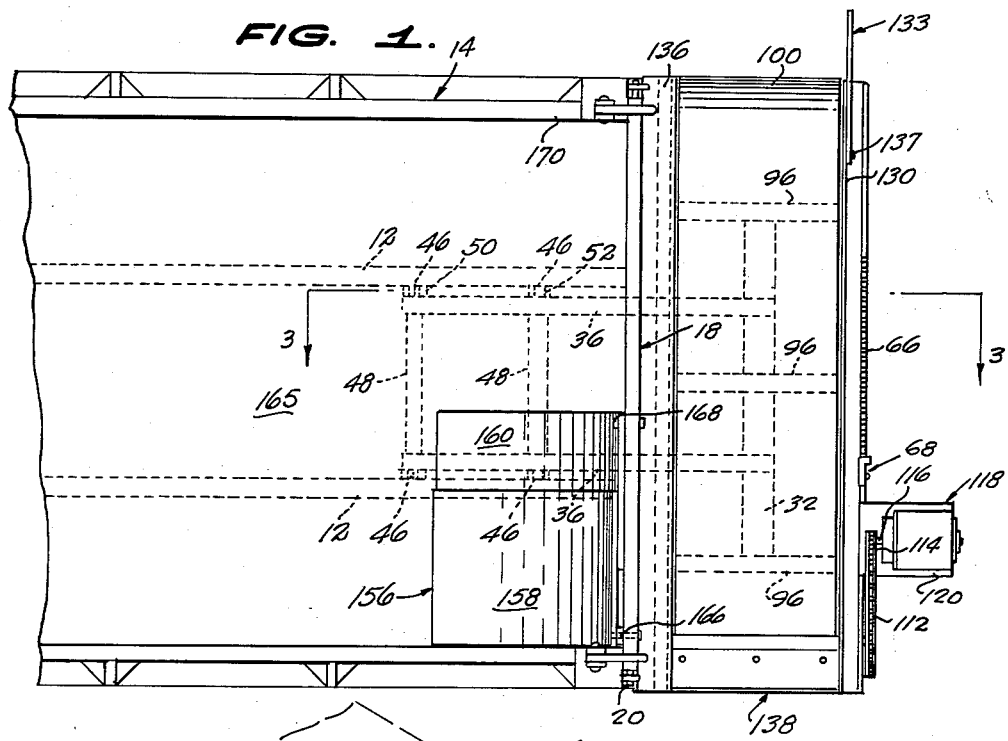
FIGURE 1 is a fragmentary top plan view of a dump truck equipped with a conveyor attachment in accordance with the present invention.
Figure 2:
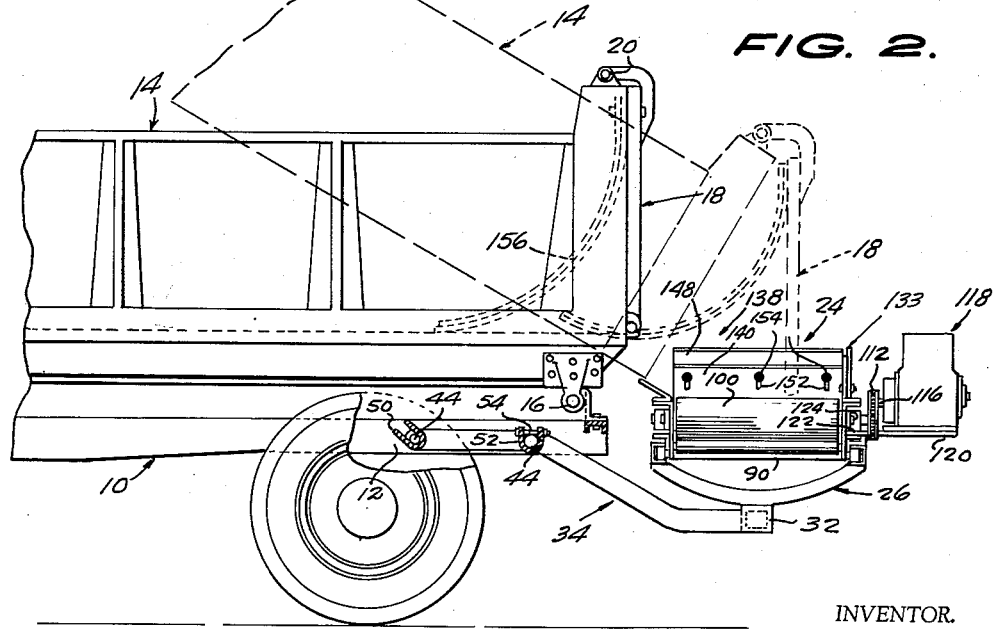
FIGURE 2 is a side elevation of FIGURE 1, showing the truck body in normal position with its tail gate closed, in full lines, and in tilted dumping position with its tail gate open, in phantom lines.

Referring in detail to the drawings, wherein like numerals designate like parts throughout the several views, a conventional form of dump truck is shown, which comprises a chassis frame 10 having spaced longitudinal members 12, a tiltable dump body 14 pivoted, at its rear end on the frame 10, as indicated at 16, and having a gravitational tail gate 18 normally closing the open end of the body 14, and pivoted, at its upper end thereon, as indicated at 20. When the dump body 14 is tilted, as indicated in FIGURE 2, the tail gate 18 swings to a perpendicular open position, so that material present in the body 14, discharges through the open end 22 of the body.

An illustrative conveyor attachment of the present invention, generally designated 24, comprises a horizontally disposed and transversely elongated support frame 26 composed of a pair of tracks, such as facing channel bars 28 which are spaced and connected together by a means embodying longitudinally spaced cross members 30, which bear upon and are fixed to a single centered transversely elongated bar 32. As shown in FIGURES 2 and 3, the cross members 30 are downwardly bowed and the single bar 32 engages the cross members at their lowest points. A bracket means 34 mounts a support frame 26 to the chassis frame 10, the bracket means being composed of a pair of laterally spaced longitudinal bars 36 which are centered relative to and having one of their complemental ends fixed to the single bar 32 and reach forwardly beyond the frame 26. As shown in FIGURES 2 and 3 the longitudinal bars 36 have depressed rear portions 38, on which the cross members 30 are fixed, forwardly and upwardly angled intermediate portions 40, and elevated forward portions 42 or portions adjacent the other of their complemental ends. A pair of longitudinally spaced, transverse rods 44 extend through the forward portions 42 and have projecting ends 46. Spaced sleeves 48 are circumposed on the rods 44 between the forward portions 42.

The forward portions 42 are depressed between and on a level with the truck chassis members 12 of the chassis frame 10, and the rod ends 46 are removably seated in forward and rear U-shaped seats 50 and 52, respectively, the rear seat 52 having a removable retaining bolt 54 on and extending across the upper ends of its legs 56.

A conveyor trough 58 is disposed between the channel bars 28, extends thereabove, and comprises a pair of vertical forward and rear side plates 60 and 62, respectively, which are positioned close to the facing open sides of the channel bars 28, as shown in FIGURE 6, and have adjacent to their lower edges, longitudinally spaced rollers 64 which are rollably confined in the channel bars, whereby the conveyor trough 58, which is substantially the same in length as the support frame 26, and is slidable thereon from a coextensive retracted non-use position, shown in full lines in FIGURE 5, to an extended use position, shown in phantom lines.

Position holding means for the conveyor trough 58 comprises a rack 66, fixed upon the upper flange of the rear channel bar 28, and a latch 68 pivoted at one end thereof, as indicated at 70, on a vertical lug 72 on an external lateral bracing flange 76 affixed to the rear conveyor frame plate, above the rack 66. The latch 68 comprises an elongated straight shank 78 having a downwardly extending dog 80, at its free end, to engage between teeth of the rack 66, and a lateral fingerpiece 82, facilitating upward releasing movement of the latch 68 from the rack.

An external bracing flange 84, like the flange 76, is on the forward conveyor trough plate 60.

The conveyor trough 58 further comprises channel cross members 86 spaced along and fixed at their ends to the forward and rear plates 60 and 62, and spaced below the members 86, on a level with the channel bars 28, are longitudinally spaced shafts 88, on which belt supporting rollers 90 are journaled. On the level of the cross members 86, and at the ends of the conveyor trough 58, inner and outer shafts 92 and 94, have relatively large diameter belt rollers 96 and 98, respectively journaled thereon, over which an endless flexible conveyor belt 100 is trained.

The outer roller shaft 94 is journaled on blocks 102 which slide horizontally in slideways 104 extending across openings 105 in the trough frame plates 60 and 62, at their outer ends. Belt tighteners comprise pairs of longitudinally spaced lateral lugs 106 fixed on the forward and rear sides of the side plates 60 and 62, through which are threaded bolts 108 whose outer ends bear against the related blocks 102.

The inner belt shaft 92 has a sprocket wheel 110, on its rear end, behind the rear side plate 62 of the conveyor trough 58, over which is trained a sprocket chain 112 which is trained also over a sprocket wheel 114 on the drive shaft 116 of a suitable motor 118, such as a miniature gasoline engine. The engine 118 is mounted upon a horizontal plate 120 which has an upstanding flange 122, along its forward edge, which is bolted, as indicated at 124 to the rear side plate 62, above its reinforcing flange 76.

The forward and rear conveyor trough side plates 60 and 62 have, on their upper edges, oppositely directed lateral flanges 126 and 128, respectively. An erect L-shaped trough wall 130 is mounted upon and extends the length of the lateral flange 128 and secured thereto, as indicated at 132, in line with the rear side plate 62. A longitudinally adjustable deflector plate 133 is mounted on the rear trough wall 130, for extension beyond the right-hand end of the trough, to prevent material discharged from the trough from falling behind the trough, as the truck is moved forwardly while material is being discharged. The rear wall 130 has a line of bolt holes 135, through related ones of which a bolt 137, secured to the deflector plate, passes.

Fixed, as indicated at 134, upon the lateral flange 126 of the forward trough side plate 60, and extending the length thereof, is a forwardly inclined trough wall 136, which, as shown in FIGURES 2 and 3, is positioned beneath the opening of the truck dump body 14, in position to receive and direct into the conveyor trough 58 and onto the belt 100, material discharged from the body, as the body is rearwardly tilted and its tail gate 18 swings to open position.

An outwardly and downwardly angled, vertically adjustable inner end wall 138 extends across the inner end of the conveyor trough 58, above the conveyor belt 100. The end wall 138 comprises a fixed lower section 140, which is fixed to the rear trough wall, as indicated at 142, and has a lower edge 144 positioned close to the upper flight 146 of the conveyor belt 100, which serves as a cleaner or scraper for the conveyor belt. A vertically adjustable upper section 148 bears upon the outer surface of the lower section 140 and reaches thereabove, and has bolts 150 affixed thereto, which extend through vertical adjustment slots 152, provided in the lower section 140, and having heads 154 bearing upon the related surfaces of the lower section 140.

It will be seen from the foregoing, that other than starting the engine 118 and tilting the dump body 14, the operator of the truck is not required to leave the driver's seat for either continuous or intermittent discharge of material from the conveyor trough 58, with the truck in either a moving or standing position.

When the conveyor trough 58 is in an extended position, such as shown in phantom lines in FIGURE 5, part of the material discharged from the dump body 14 would fall behind the conveyor trough. To provide against this the tail gate 18 is provided, on its forward side, and at its left-hand end, as viewed in the drawings, with a deflector 156, which serves to confine flow of the material to the right-hand portion of the open end of the dump body 14, and hence to being discharged into the conveyor trough 58. The deflector 156 has laterally overlapped rectangular arcuate plates 158 and 160, which curve downwardly and forwardly and have lower ends 162 and 164, respectively, which rest upon the floor 165 of the dump body 14, at a location spaced forwardly from the tail gate 18. The left-hand plate 158 is permanently affixed at its upper edge to the tail gate 18, at the upper edge thereof, as indicated at 166, while the right-hand plate 160 is temporarily bolted, at its upper edge, to the tail gate, at the upper edge thereof, as indicated at 168, so that the right-hand plate 160 can be adjusted crosswise of the dump body 14 for adjusting the aperture between the right-hand plate 160 and the adjacent sidewall 170 of the body, for determining proper flow of material from the body to the conveyor trough 58, in extended positions of the trough.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a truck having a chassis frame, said chassis frame having a pair of spaced longitudinal members, a dump body pivoted on the frame and having an open end, a tail gate pivoted on the body and normally closing said open end, said tail gate being swingable away from the open end in a tilted position of the dump body, a horizontal support frame positioned at and beneath said open end and extending thereacross, bracket means mounting the support frame to the chassis frame, a conveyor trough supported on the support frame to move from a retracted position coextensive with the support frame to an extended position reaching beyond one end of the support frame, an endless belt extending along and mounted within the trough, said belt having a top flight adapted to move toward said one end of the trough, means for operating the belt, and latch means acting between the support frame and the trough for holding the trough in retracted and extended positions, said support frame comprising a pair of spaced tracks, means connecting and spacing the tracks, and a transversely-disposed elongated bar fixed to said spacing means, said chassis frame members having the facing sides provided with longitudinally-spaced seats, said bracket means including a pair of laterally-spaced longitudinal bars having one of the complemental ends attached to said transversely-disposed bar and having the portions adjacent the other of the complemental ends extending beneath the truck chassis frame and removably engaged with the seat, the trough having longitudinally spaced lateral rollers engaged with the tracks.

2. In combination, a truck having a chassis frame, said chassis frame having a pair of spaced longitudinal members, a dump body pivoted on the frame and having an open end, a tail gate pivoted on the body and normally closing said open end, said tail gate being swingable away from the open end in a tilted position of the dump body, a horizontal support frame positioned at and beneath said open end and extending thereacross, bracket means mounting the support frame to the chassis frame, a conveyor trough supported on the support frame to move from a retracted position coextensive with the support frame to an extended position reaching beyond one end of the support frame, an endless belt extending along and mounted within the trough, said belt having a top flight adapted to move toward said one end of the trough, means for operating the belt, and latch means acting between the support frame and the trough for holding the trough in retracted and extended positions, said support frame comprising a pair of spaced tracks, means connecting and spacing the tracks, and a transversely-disposed elongated bar fixed to said spacing means, said chassis frame members having the facing sides provided with longitudinally-spaced seats, said bracket means including a pair of laterally-spaced longitudinal bars having one of the complemental ends attached to said transversely-disposed bar and having the portions adjacent the other of the complemental ends extending beneath the truck chassis frame and removably engaged with the seats, the trough having longitudinally spaced lateral rollers engaged with the tracks, said latch means comprising a rack on and extending along a track, and a lever pivoted on the trough above the rack and having a dog engaged with the rack.

3. In combination, a truck having a chassis frame, a dump body pivoted on the frame and having an open end, a tail gate pivoted on the body and normally closing said open end, said tail gate being swingable away from the open end in a tilted position of the dump body, a horizontal support frame positioned at and beneath said open end and extending thereacross, bracket means mounting the support frame to the chassis frame, a conveyor trough supported on the support frame to move from a retracted position coextensive with the support frame to an extended position reaching beyond one end of the support frame, an endless belt extending along and mounted within the trough, said belt having a top flight adapted to move toward said one end of the trough, means for operating the belt, and latch means acting between the support frame and the trough for holding the trough in retracted and extended positions, said dump body having sidewalls and a floor defining said open end, and a deflector mounted on the side of the tail gate remote from the trough and reaching to the floor, said deflector extending from the sidewall remote from said one end of the support frame toward the other sidewall and being laterally spaced from said other sidewall so as to limit discharge of material from the open end of the dump body to the space between the deflector and said other sidewall when the conveyor trough is in an extended position, said deflector comprising overlapped arcuate plates curving downwardly and away from said remote side of the tail gate and having lower edges engaged with the dump body floor, one of the deflector plates being fixed to the tail gate and extending laterally inwardly from said remote sidewall, and the other deflector plate reaching laterally inwardly beyond the said one deflector plate and being laterally adjustable relative thereto.

References Cited in the file of this patent

UNITED STATES PATENTS

| | | |
|---|---|---|
| 790,547 | Adams et al. | May 23, 1905 |
| 1,179,391 | Bachman | Apr. 18, 1916 |
| 1,825,572 | Boger | Sept. 29, 1931 |
| 2,146,676 | Lawson | Feb. 7, 1939 |
| 2,484,689 | Davis | Oct. 11, 1949 |
| 2,503,129 | Pautz | Apr. 4, 1950 |
| 2,563,736 | Newell | Apr. 7, 1951 |
| 2,584,069 | Wall | Jan. 29, 1952 |
| 2,609,080 | Overman | Sept. 2, 1952 |
| 2,685,958 | White | Aug. 10, 1954 |
| 2,805,666 | Schlossmacher | Sept. 10, 1957 |
| 3,018,908 | Wilton et al. | Jan. 30, 1962 |